Figures 1, 2:
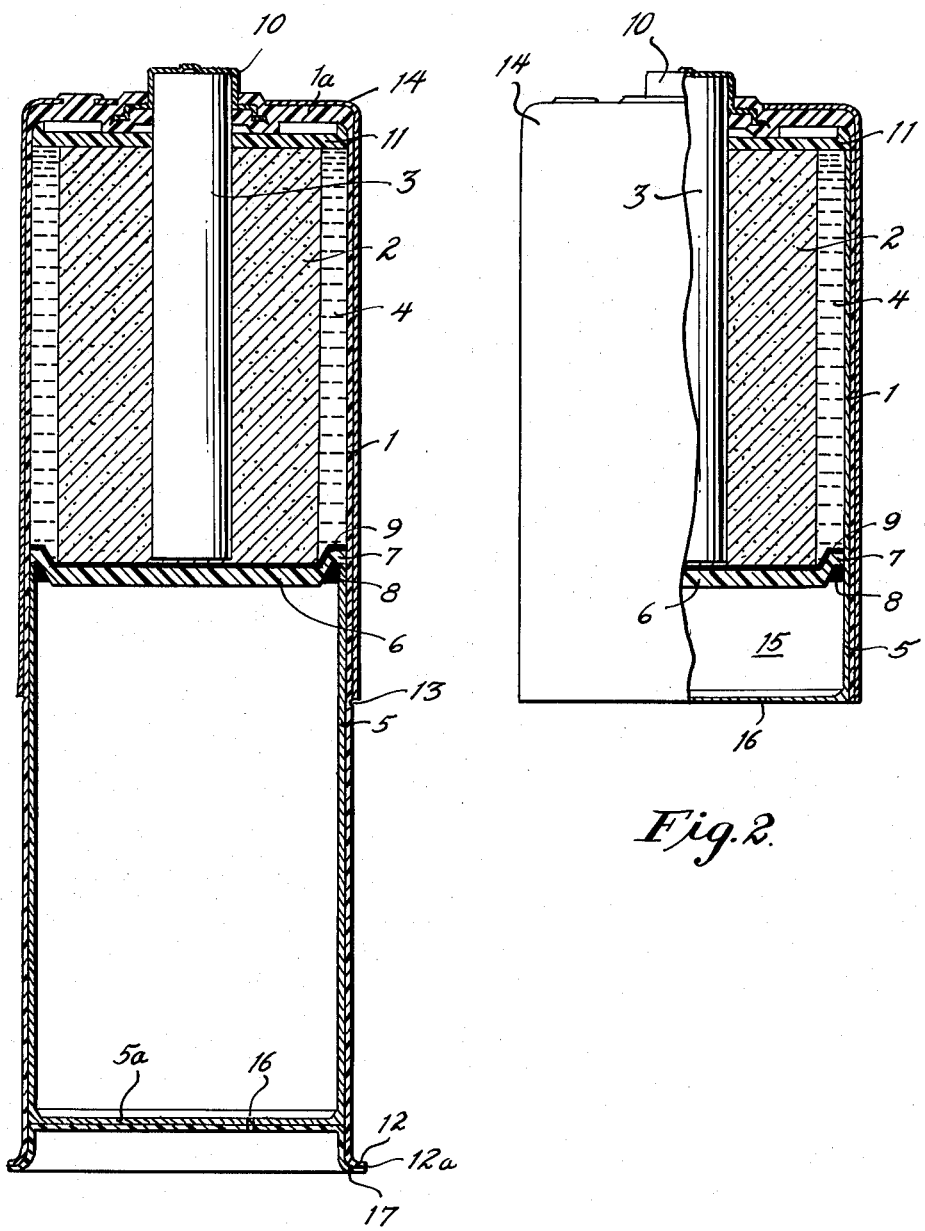

United States Patent Office 3,257,243
Patented June 21, 1966

3,257,243
PRIMARY BATTERY CELL
Wilhelm Wild, Ellwangen, Jagst, Germany, assignor to Pertrix-Union G.m.b.H., Ellwangen, Jagst, Germany, a corporation of Germany
Filed Jan. 25, 1963, Ser. No. 253,847
Claims priority, application Germany, Feb. 1, 1962, P 28,719
17 Claims. (Cl. 136—113)

The present invention relates to improvements in primary batteries, and more particularly to an arrangement wherein the electrode components of a dry cell are stored in a common jacket separated and insulated from each other whereby they avoid self-discharge and may be stored indefinitely while being capable of being assembled into immediate operating condition within the protective jacket.

For several decades, the battery industry has made efforts to produce dry cells which may be stored for extended periods of time. By properly selecting the raw materials for the dry cell components and by sealing the assembly from the atmosphere, it has been possible to eliminate so much of the self-discharge and desiccating and corrosive conditions that the dry cell may be stored for two or three years at temperate climatic conditions, i.e. about 22° C. and about 55% relative humidity.

However, even under very exacting manufacturing standards assuring high-quality products, it has been impossible to avoid considerable losses of efficiency and even complete failures in dry cells stored for more than 2 or 3 years because absolute uniformity in the individual units cannot be achieved under the necessary mass-production procedures required to make economical operations feasible for the making of a product, i.e. a dry cell, which, after all, is disposed of after use and, therefore, must be reasonably priced if it is to compete in the market place.

Also, it has proved to be impossible fully to protect dry cells against the influence of elevated temperatures, such as encountered, for instance, in tropical or subtropical regions. Under such conditions, whole lots of stored dry cells frequently become inoperative rather rapidly. Even high-quality cells made with the best available raw materials and, for instance, the most suitable types of zinc, show a self-discharge factor of four to five times that of similar cells stored under temperate climatic conditions if they are stored at elevated temperatures, such as 45° C.

Thus, stored dry cells show various phenomena of self-discharge and desiccation, such as local current paths, contact corrosions, holes in the zinc can, due to local corrosion, encrustation of the electrolyte-containing gelatinous paste and of the carbon rod, etc. Even if decreased efficiency of stored dry cells would be acceptable, the stored cells become altogether useless once the zinc can has been pitted with holes. Even the smallest hole makes the dry cell practically useless and makes it subject to rapid destruction because the air entering through such a hole makes any attempted sealing illusory.

However, it is important, under certain circumstances, to have available dry cells which are fully effective even after years of storage under the most unfavorable climatic conditions. Therefore, attempts have been made to produce such dependably storageable batteries having a practically unlimited storage life. For instance, in Leclanche-type batteries of this kind, the postive electrode (carbon rod embedded in a depolarizer mass) has been completely dried by treatment in a drying furnace and the dried positive electrode was then placed into the zinc can. The annular space between the positive and negative electrodes was then filled with an equally dry but absorptive material, such as, for instance, tragacanth powder with an addition of ammonium chloride, starch granules, filter or like absorptive paper, etc. A suitable spout was provided so that water may be introduced into the dry cell to activate the same at the time of desired use. Alternatively, the activating liquid was arranged in a frangible container at the bottom of the dry cell and was broken by suitable means at the time the battery was put to use.

However, such batteries have considerable shortcomings at the time they are to be placed into operative condition. Many hours and, frequently, one or more days are required for the activating liquid to impregnate the completely desiccated cell components, particularly the depolarizer bobbin which has been encrusted by salts during the drying procedure. Therefore, there is a considerable time lag before the cell produces current and an even distribution of the liquid over the entire volume of the cell often never occurs so that it is impossible to fully use the active cell materials and thus to operate the cell at its full efficiency.

The unfavorable chemical and physical changes produced during the complete desiccation, particularly of the positive electrode components, cannot be reversed when water and/or electrolyte is added at the time the cell is put into operation so that these cells have only about one half of two thirds of the capacity of cells with the same components but used without desiccation of their components for purposes of long-time storage.

It is a primary object of the present invention to overcome these and other disadvantages and to produce a dry cell which may be stored indefinitely under all climatic conditions and which is ready for immediate and substantially full-capacity operation whenever desired.

This and other objects are accomplished by this invention by storing the positive electrode with the electrolyte-containing paste layer and the negative electrode in a common moisture- and air-impermeable jacket but insulated and separated from each other, and by moving them together into operative condition when desired so that the ensuing electrochemical reactions may produce a current in the conventional manner.

Such a galvanic dry cell comprises a positive electrode consisting of a central electric current collector and conductor rod embedded in a depolarizer mass, a metallic can, such as zinc, serving as anode, the positive electrode and the anode being coaxial, and an electrolyte-containing paste layer surrounding the positive electrode.

According to the invention, a moisture- and air-impermeable jacket surrounds the positive electrode with the paste layer as well as the anode separately arranged therefrom. The positive electrode with the paste layer is mounted in the jacket in a first axial position coaxial with, but outside of, the anode can and movable to a second axial position within the anode can and concentrically surrounded thereby. An electrically insulating separating means at the bottom of the positive electrode and paste layer insulates and separates the positive electrode and paste layer from the anode can in the first axial position thereof.

The above and other objects, advantages and features of the present invention will become more apparent from the following detailed description of a specific embodiment thereof, taken in conjunction with the accompanying drawing wherein FIG. 1 is a vertical sectional view of a dry cell according to this invention, in the first or storage position, and FIG. 2 is a like view of the dry cell in the second position, in operating condition.

Referring now to the drawing, the dry cell of the invention is shown enveloped in a moisture-and air-impermeable tubular jacket 1 integrally formed with a radially inwardly extending closure member 1a. Any suitable moisture- and air-impermeable material may be used for the jacket and closure member but it will be normally most practical and economical to use a flexible synthetic resin sheet material, for instance, of polyethylene, polypropylene, nylon, saran, and like organic plastics.

The general structure of the dry cell components is conventional, as clearly appears from the exemplary embodiment illustrated in the drawing. Obviously, other dry cell structures may make use of the enveloping jacket of this invention, which permits the operating components of the cell to be stored with the components out of contact and to be telescoped into operating condition, and the embodiment specifically shown and described is merely illustrative and in no way limiting of the invention.

In the illustrated dry cell, the positive electrode consists of a central electric current collector and conductor rod 3, which may usefully consist of carbon, embedded in a cylindrical depolarizer mass 2, which may be a conventional bobbin of depolarizing mix, such as, for instance, described on pp. 45 to 50 of George Wood Vinal's "Primary Batteries," John Wiley & Sons, Inc., New York, Third Edition. Since the invention is concerned with the physical arrangement of the dry cell components, their actual composition is, of course, not critical and will be chosen by the manufacturer according to his own specifications and needs.

An annular electrolyte-containing gelatinous paste layer 4 surrounds the positive electrode and, in the operating position of the dry cell components (see FIG. 2), it serves both as a separator and as a reservoir for a considerable part of the electrolyte, as is well known (see "Primary Batteries," pp. 51 and 52).

The cuplike anode of the dry cell is formed by a metallic can 5 which has a cylindrical wall and a bottom 5a. In the usual dry cell, this can will be of zinc.

An electrically insulating separating means mounts the positive electrode and paste layer on the tope of the metallic can wall so that they are separated and insulated from the metallic can in a first axial position, as shown in FIG. 1. As is clearly indicated in the drawing, the positive electrode 2, 3, the annular paste layer 4 and the cylindrical wall of the metallic can 5 are coaxial and the tubular jacket 1 surrounds the positive electrode and paste layer as well as the cylindrical wall of the metallic can.

The insulating separating means includes an elastic insulating disc 6 having an annular flange 7 supporting the positive electrode and paste layer in the tubular jacket 1 on the rim of the cylindrical wall of the metallic can in a first axial position wherein the positive electrode with the paste layer is arranged coaxially with, but outside of, the cylindrical wall of the metallic can (see FIG. 1).

The insulating disc may be composed of any useful insulating material and will preferably be made of a synthetic resin for reasons of convenience and economy. If desired, it may, for example, be made of the same material as the jacket 1 but other synthetic resins, natural and synthetic rubber, and like insulating materials may also be used.

To improve the insulation, an annular insulating gasket 8 is provided between the insulating disc and the can wall in the recess formed by flange 7. Any useful sealing material may be used for the gasket, such as wax, pitch, and the like. Also, a layer 9, for instance, of soft bitumen, is arranged between the disc 6 and the bottom of the positive electrode and paste layer to prevent disintegration of the bobbin. A synthetic resin washer 11 is slipped over the central carbon rod to centralize the assembly and prevent leakage of electrolyte during the filling operation. The usual brass cap 10 forms the positive terminal of the cell and the thickened rim of closure member 1a may be injection molded about a flange of the brass cap.

As shown in FIG. 1, the tubular jacket 1 has an annular foot portion 12; an air- and moisture-impermeable bottom closure member 17, for instance, of the same material as the jacket, is fitted into the jacket end as a plug and is preferably bonded to the foot portion 12 of the jacket. If thermoplastic synthetic resins are used, such bonding may be effected by heating and/or welding the contacting portions of the jacket and the closure member to provide an autogenous bond 12a.

When the dry cell stored in the condition illustrated in FIG. 1 is to be put to use, zinc can 5 is simply telescopically moved against the positive electrode and paste layer after removing the annular foot portion 12 for instance by cutting. Thereby, the positive electrode and paste layer move like a piston into the second axial position shown in FIG. 2, wherein they are arranged within the zinc can 5 and are surrounded concentrically thereby so as to constitute a current-producing galvanic dry cell. This cell will be ready for full operation immediately upon this telescoping movement, as any conventional dry cell.

The portion of the jacket 1 extending beyond the bottom of the can in the operating condition of the dry cell is simply removed by tearing, cutting, or the like. If desired, a score line 13 may be provided on the jacket to facilitate the removal of the excess jacket portion at that point.

To enable air to escape from the bottom of the metallic can when the positive electrode is telescoped piston-like into the can 5, a tiny ventilating opening 16 may be provided in bottom 5a of the can, such opening preferably having a diameter of less than 1 mm.

Also, the axial length of the metallic can 5 exceeds the axial length of the cylindrical depolarizer bobbin 2 whereby an expansion chamber 15 remains in the second axial position of the positive electrode. During discharge of the cell any increase in volume of depolarizer or electrolyte can thus be accommodated.

For purposes of stabilizing the shape of the flexible jacket 1, that portion of the jacket which surrounds the positive electrode and paste layer may be surrounded or encased by a cylindrical metallic shell 14 which preferably reaches only to score line 13 so that it will form a properly fitting, rigid envelope for the battery cell in its operating position (FIG. 2).

Since the insulating means 6, 7, 8, 9 is elastic or yielding, it will be under compression when the positive electrode and paste layer have been telescoped into the metallic can 5 and will thus form a dependable seal. Also since the diameter of the annular paste layer 4 exceeds the inner diameter of the cylindrical zinc can wall by the thickness of the wall in the storage position of the cell (FIG. 1), this layer will make good, operative contact with the zinc can wall in the operating position of the cell (FIG. 2) even if the gelatinous paste should have slightly shrunk after many years of storage so as to assure full operating efficiency of the cell. This is another outstanding advantage of the present invention.

During storage, the separate storing of the cell electrodes assures, of course, the prevention of any self-discharge or zinc corrosion. The metallic can is maintained in its original condition fully protected against all atmospheric corrosion and thus may be stored indefinitely. No liquid additions are required for activating the cell and the cell is immediately ready for full and efficient operation of nearly the same capacity when it is telescoped into operating condition after years of storage as if it had been used shortly after manufacture. There is no undesirable time lag between activation of the stored cell and operation of the cell, due to the time needed for the activating liquid to penetrate through the paste layer and/or depolarizer bobbin.

While the invention has been described in connection with certain embodiments thereof, it will be clearly understood that many modifications and variations may occur to the skilled in the art without departing from the spirit and scope thereof as defined in the appended claims.

I claim:

1. A galvanic dry cell comprising a positive electrode consisting of a central electric current collector and conductor rod embedded in a cylindrical depolarizer mass, an annular electrolyte-containing paste layer surrounding the positive electrode, a metallic can serving as anode and having a cylindrical wall and a bottom, the positive electrode, the annular paste layer and the cylindrical wall of the metallic can being coaxial, a moisture- and air-impermeable unitary tubular jacket concentrically surrounding the positive electrode with the paste layer and the cylindrical wall of the metallic can, the portion of the jacket surrounding the can being separable from the rest of the jacket and removable from about the can while leaving in place the rest of the jacket surrounding the positive electrode the positive electrode with the paste layer being mounted in the tubular jacket in a first axial position coaxial with, but outside of, the cylindrical wall of the metallic can and being telescopically movable while remaining within the tubular jacket like a piston into a second axial position within the metallic can and surrounded concentrically thereby so as to constitute a current-producing galvanic dry cell, the rest of the tubular jacket surrounding the can while in said second axial position, and an electrically insulating separating means of disalike configuration located in sealing relationship with the can, said means being mounted to separate and insulate the positive electrode and paste layer from the metallic can in said first axial position, and said means being slidable together with the positive electrode into the can while maintaining sealing relationship with the inside wall of the can in said second axial position, said means being located adjacent and covering an end of the positive electrode and intervening between it and the end of the can in both the first and second axial positions.

2. The galvanic dry cell of claim 1, wherein said jacket is of synthetic resin.

3. The galvanic dry cell of claim 2, wherein said synthetic resin is polyethylene.

4. The galvanic dry cell of claim 1, wherein the bottom position of the metallic can defines therein an expansion chamber vented through the bottom of the can by an air escape opening.

5. The galvanic dry cell of claim 4, wherein the air escape opening is of a diameter of less than 1 mm.

6. The galvanic dry cell of claim 1, wherein the axial length of the metallic can exceeds the axial length of the cylindrical depolarizer mass whereby an expansion chamber bounded by the end of the can, the disclike separating means, and the intervening portions of the cylindrical wall of the can remains in the can in the second axial position of the positive electrode.

7. The galvanic dry cell of claim 1,, further comprising a cylindrical metallic shell encasing the portion of the tubular jacket surrounding the positive electrode and paste layer.

8. The galvanic dry cell of claim 7, further comprising a moisture- and air-impermeable closure member integral with the tubular jacket and extending radially inwardly therefrom into contact with the central electric current collector and conductor rod, and a radially inwardly extending metallic cover member integral with the cylindrical metallic shell and covering at least a portion of the closure member.

9. In a galvanic dry cell assembly having components adapted to be telescoped from an inoperative storage position to an operative position, a positive electrode surrounded by an annular electrolyte-containing paste layer, a cuplike metallic anode open toward but spaced axially from the foregoing components and telescopable therewith to receive the same therein in the operative position, disclike sealing means spacing the anode from the remaining foregoing components in the storage position and yieldable to telescope therewith into the cuplike anode while maintaining sealing contact with the wall of the anode in the operative position, the disclike sealing means lying adjacent and covering an end of the positive electrode in both the storage and operative positions, and a surrounding jacket of electrically insulating material.

10. In a galvanic dry cell assembly having components adapted to be telescoped from an inoperative storage position to an operative position, a positive electrode surrounded by an annular electrolyte-containing paste layer, a cuplike metallic anode open toward but spaced axially from the foregoing components and telescopable therewith to receive the same therein in the operative position, disclike sealing means spacing the anode from the remaining foregoing components in the storage position and yieldable to telescope therewith into the cuplike anode while maintaining sealing contact with the wall of the anode in the operative position, the disclike sealing means lying adjacent and covering an end of the positive electrode in both the storage and operative positions, the peripheral portion of the disclike means having a flange tapering into the open end of the cuplike anode, and a surrounding jacket of electrically insulating material.

11. In a galvanic dry cell assembly having components adapted to be telescoped from an inoperative storage position to an operative position, a positive electrode surrounded by an annular electrolyte-containing paste layer, a cuplike metallic anode open toward but spaced axially from the foregoing components and telescopable therewith to receive the same therein in the operative position, disclike sealing means spacing the anode from the remaining foregoing components in the storage position and yieldable to telescope therewith into the cuplike anode while maintaining sealing contact with the wall of the anode in the operative position, the disclike sealing means lying adjacent and covering an end of the positive electrode in both the storage and operative positions, the peripheral portion of the disclike means having a flange tapering into the open end of the cuplike anode, an annular gasket located between the tapering flange of the disclike means and the open end wall of the cuplike anode, and a surrounding jacket of electrically insulating material.

12. In a galvanic dry cell assembly having components adapted to be telescoped from an inoperative storage position to an operative position, a positive electrode surrounded by an annular electrolyte-containing paste layer, a cuplike metallic anode open toward but spaced axially from the foregoing components and telescopable therewith to receive the same therein in the operative position, disclike sealing means spacing the anode from the remaining foregoing components in the storage position and yieldable to telescope therewith into the cuplike anode while maintaining sealing contact with the wall of the anode in the operative position, the disclike sealing means lying adjacent and covering an end of the positive electrode in both the storage and operative positions, and a surrounding jacket of electrically insulating material, the jacket extending over the entire axial length of the assembly in the storage position and the portion thereof spaced axially from the cuplike anode in the storage position telescoping thereover in the operative position.

13. In a galvanic dry cell assembly having components adapted to be telescoped from an inoperative storage position to an operative position, a positive electrode surrounded by an annular electrolyte-containing paste layer, a cuplike metallic anode open toward but spaced axially from the foregoing components and telescopable therewith to receive the same therein in the operative position, disclike sealing means spacing the anode from the remaining foregoing components in the storage position and yieldable to telescope therewith into the cuplike anode while maintaining sealing contact with the wall of the anode in the operative position, the disclike sealing means lying adjacent and covering an end of the positive electrode in both the storage and operative positions, and a surrounding unitary jacket of electrically insulating material severable circumferentially into two cylindrical pieces, one piece thereof surrounding the cuplike anode in the storage position and to be discarded before telescoping into operative position, and the other piece thereof surrounding the positive electrode and paste layer in the storage position and surrounding the positive electrode and paste layer and cuplike anode in the operative position.

14. In a galvanic dry cell assembly having components adapted to be telescoped from an inoperative storage position to an operative position, a positive electrode surrounded by an annular electrolyte-containing paste layer, a cuplike metallic anode open toward but spaced axially from the foregoing components and telescopable therewith to receive the same therein in the operative position, disclike sealing means spacing the anode from the remaining foregoing components in the storage position and yieldable to telescope therewith into the cuplike anode while maintaining sealing contact with the wall of the anode in the operative position, the disclike sealing means lying adjacent and covering an end of the positive electrode in both the storage and operative positions, and a surrounding jacket of electrically insulating material, the jacket extending over the entire axial length of the assembly in the storage position and the portion thereof spaced axially from the cuplike anode in the storage position telescoping thereover in the operative position, the jacket extending also beyond the closed end of the cuplike anode and having a cylindrical plug fitting within that extension thereof beyond the end and bonded to the end of the jacket.

15. The assembly of claim 14 wherein the plug comprises a cuplike member similar in composition to the tubular jacket and open away from the rest of the assembly, thereby providing a cylindrical recess in that one end of the assembly.

16. In a galvanic dry cell assembly having components adapted to be telescoped from an inoperative storage position to an operative position, a positive electrode surrounded by an annular electrolyte-containing paste layer, a cuplike metallic anode open toward but spaced axially from the foregoing components and telescopable therewith to receive the same therein in the operative position, disclike sealing means spacing the anode from the remaining foregoing components in the storage position and yieldable to telescope therewith into the cuplike anode while maintaining sealing contact with the wall of the anode in the operative position, a surrounding unitary jacket of electrically insulating material extending over the entire axial length of the foregoing components of the assembly in the storage position, and a rigid inverted cuplike member covering the portion of the jacket spaced axially from the anode in the storage position and covering also a portion of the anode including the rim of the open end thereof, the jacket being severable circumferentially along the rim of the rigid inverted cuplike member into two cylindrical pieces, one piece thereof surrounding the cuplike anode in the storage position and to be discarded before telescoping into operative position, and the other piece thereof surrounding the positive electrode and paste layer in the storage position and surrounding the positive electrode and paste layer and cuplike anode in the operative position.

17. The assembly of claim 16 wherein the positive electrode has a conducting member protruding axially beyond the rest of the electrode away from the cuplike anode, and the rigid inverted cuplike member has an axial opening therethrough to accommodate the protruding end of the conducting member; the tubular jacket extends along substantially the entire rigid inverted cuplike member and has a similar axial opening therein to accommodate the protruding end of the conducting member, and the tubular jacket extends also beyond the closed end of the cuplike anode; and an inverted cuplike plug fits within that extension of the tubular jacket and is bonded thereto.

References Cited by the Examiner
UNITED STATES PATENTS

| | | | |
|---|---|---|---|
| 1,438,084 | 12/1922 | Benner et al. | 136—113 |
| 1,438,085 | 12/1922 | Benner et al. | 136—113 |
| 1,505,644 | 8/1924 | Huntley | 136—113 |
| 2,802,042 | 8/1927 | Anthony et al. | 136—133 |
| 2,829,186 | 4/1958 | Kort | 136—133 |
| 3,051,769 | 8/1962 | Jammet | 136—133 |
| 3,090,824 | 5/1963 | Reilly et al. | 136—133 |

ALLEN B. CURTIS, *Primary Examiner.*

JOHN H. MACK, WINSTON A. DOUGLAS,
*Examiners.*

W. VANSISE, A. SKAPARS, *Assistant Examiners.*